United States Patent [19]

Ward

[11] Patent Number: 4,738,480
[45] Date of Patent: Apr. 19, 1988

[54] VAN BODY CONVERSION

[76] Inventor: Jeffrey L. Ward, 701 Madison St., Gretna, La. 70053

[21] Appl. No.: 863,524

[22] Filed: May 15, 1986

[51] Int. Cl.⁴ ............................................. B62D 33/04
[52] U.S. Cl. ................................. 296/24 R; 296/37.6; 296/39 R
[58] Field of Search .................... 296/24 R, 37.1, 37.8, 296/37.14, 37.15, 37.16, 39 R, 10, 37.6; 224/42.42 R

[56] References Cited

U.S. PATENT DOCUMENTS

| | | | |
|---|---|---|---|
| 1,404,484 | 1/1922 | Schoonmaker | 296/37.15 |
| 3,632,154 | 1/1972 | Woodrich | 296/24 R |
| 3,891,263 | 6/1975 | Orsulak | 296/24 R |
| 4,173,369 | 11/1979 | Roggin | 296/24 R |
| 4,470,228 | 9/1984 | Dirck | 296/24 R |
| 4,613,183 | 9/1986 | Kesling | 296/183 |

FOREIGN PATENT DOCUMENTS

| | | | |
|---|---|---|---|
| 2278537 | 3/1976 | France | 296/37.8 |
| 314532 | 6/1956 | Switzerland | 296/24 R |
| 1042084 | 9/1966 | United Kingdom | 296/24 R |
| 2118109 | 10/1983 | United Kingdom | 296/39 R |

Primary Examiner—Robert B. Reeves
Assistant Examiner—Carol L. Olson
Attorney, Agent, or Firm—Fleit, Jacobson, Cohn & Price

[57] ABSTRACT

An elongated lightweight truck-type of van is provided including longitudinally continuous top, opposite side and floor structures enclosing a single van interior. The van interior includes a forward operator's seat, passenger seat structure spaced rearward of the operator's seat and upstanding partition structure disposed immediately rearwardly of the passenger seat structure and extending fully between the top, opposite side and floor structures. The passenger seat structure comprises a bench-type seat defining a storage area therebeneath and the lower marginal edge of the partition structure includes an opening formed therein registered with the storage area. A rearwardly opening housing structure extends through the partition structure opening and into and substantially fully occupies the storage area beneath the passenger seat structure, the partition functioning to substantially isolate the interior portions of the van on either side of the partition structure against the free flow of air therebetween.

8 Claims, 2 Drawing Sheets

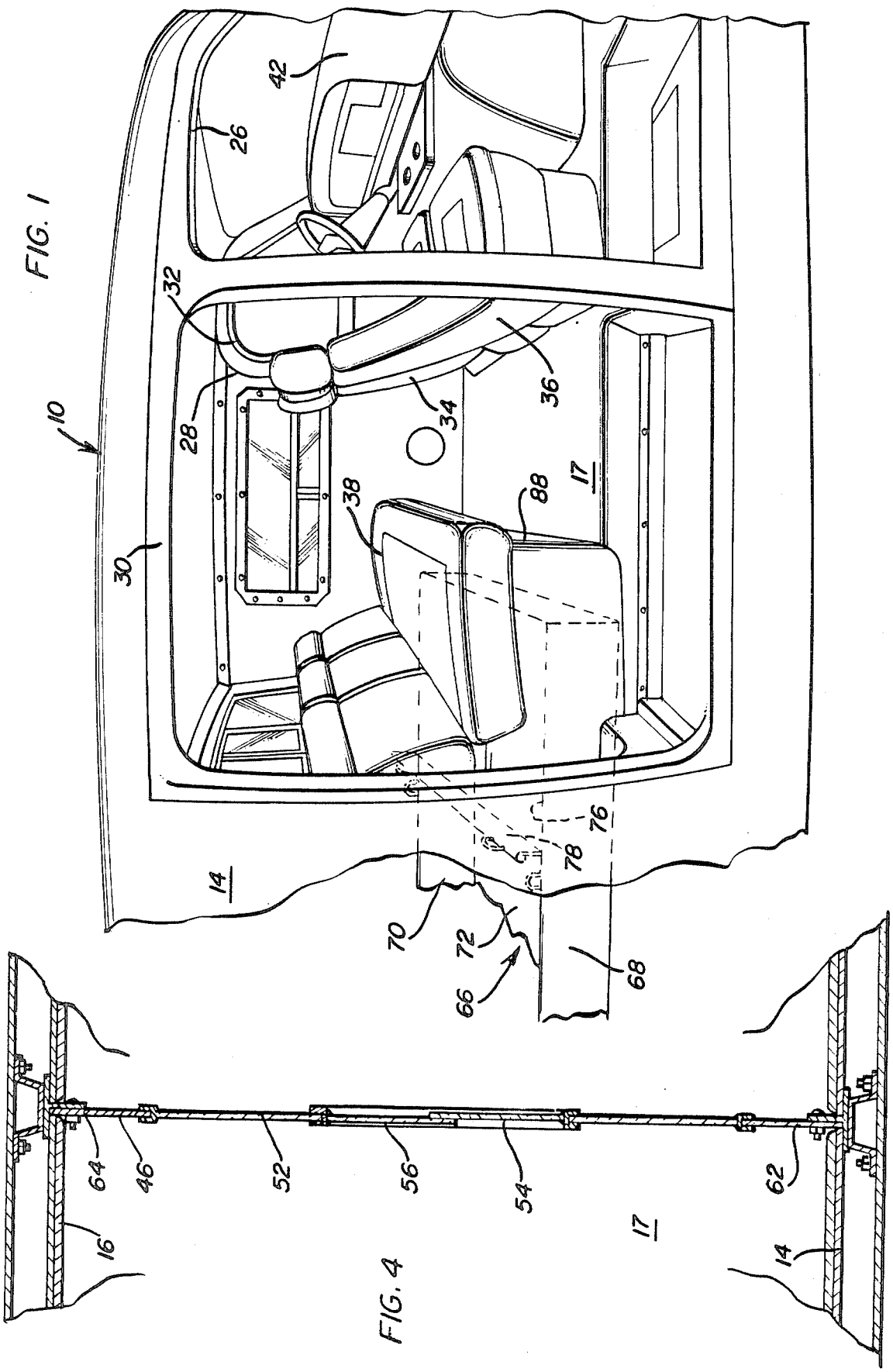

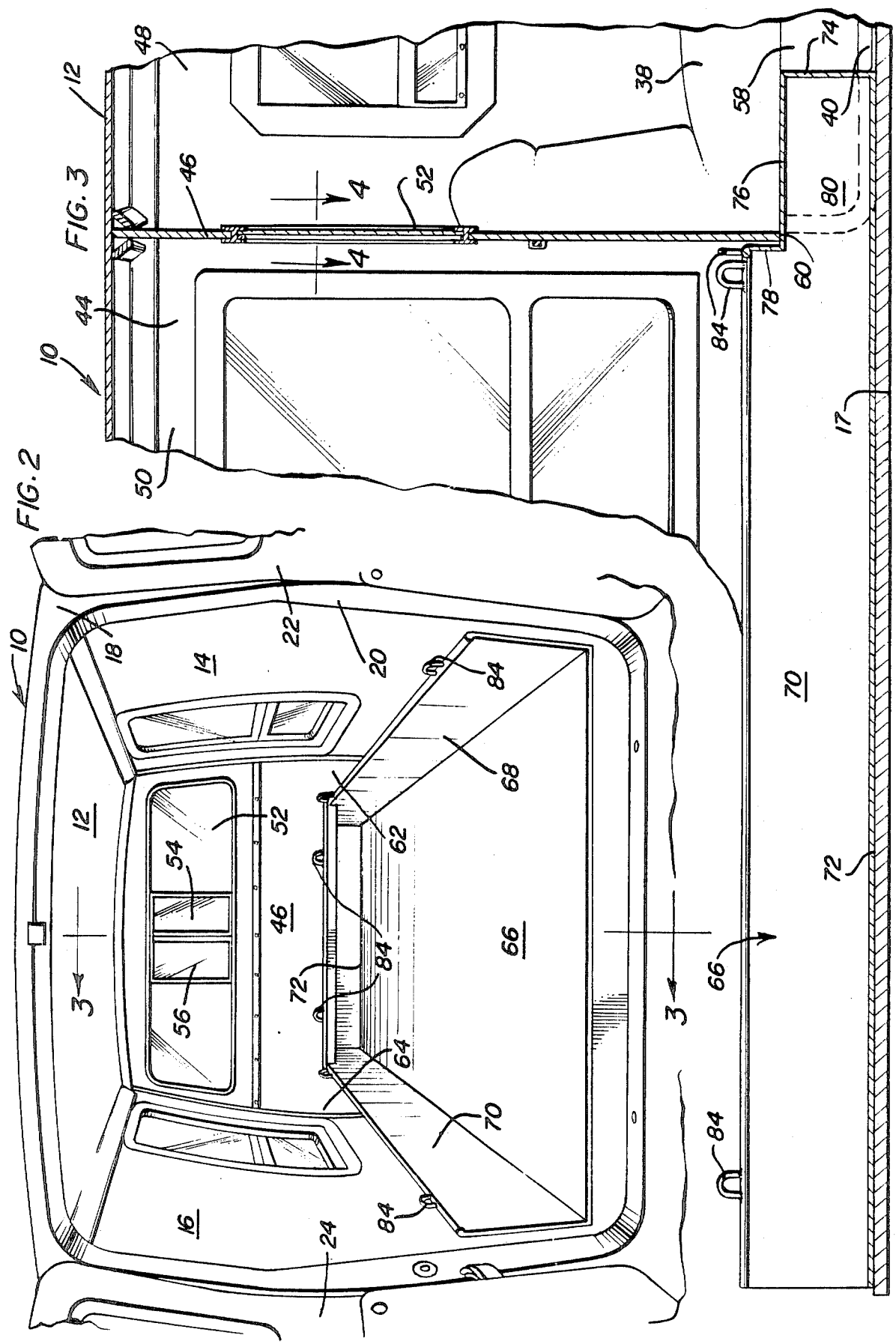

VAN BODY CONVERSION

BACKGROUND OF THE INVENTION

1. Field of the Invention

This invention relates to a light truck-type van of the passenger and/or cargo van type and more specifically to the provision of a transverse partition within the van dividing the interior thereof into a front interior portion and a rear interior portion with the partition effectively isolating the front and rear interior portions from each other against the free flow of air therebetween to thereby assist in airconditioning (heating, cooling or ventilating) the front or forward interior portion. In addition, the van is equipped with front driver and passenger seat structure as well as rear passenger seat structure in the forward van interior portion and the rear passenger seat structure defines a floor level storage area therebeneath with which a floor level opening in the partition is registered and a rearwardly opening housing structure is snugly received through the partition opening and projects into and substantially fully occupies the aforementioned storage area, whereby the rear van interior portion defining an interior load area within the rear portion of the van is extended forwardly beneath the rear passenger seat structure in the isolated passenger receiving forward portion of the van interior.

2. Description of Related Art

Various different structures heretofore have been provided for dividing the interior of a vehicle body construction into separate compartments. Examples of these structures are disclosed in U.S. Pat. Nos. 2,530,079, 2,591,308, 2,795,363, 2,816,794, 3,093,403, 3,485,522, 3,730,582, 3,822,911, 4,103,956, 4,457,555, 4,458,939, 4,505,509 and 4,514,891. However, these various forms of previously known structures do not create the type of divided van interior accomplished by the instant invention.

SUMMARY OF THE INVENTION

The van body conversion partition of the instant invention functions to divide the interior of a light truck-type passenger or cargo van into a forward van interior passenger compartment and a rear van interior load receiving compartment with the two compartments effectively isolated from each other against the free flow of air therebetween, whereby the forward airconditioning system (ventilating, heating and/or air cooling) may more effectively condition the air within the forward passenger receiving compartment of the interior of the van. In addition, the partition of the instant invention is provided with supplemental structure whereby the length of the rear cargo receiving compartment defined by the interior of the van rearward of the partition may be effectively increased to thereby enable the cargo receiving area to retain longer loads than otherwise would be allowed.

The main object of this invention is to provide structure whereby the interior of a light truck-type of passenger or cargo van may be divided into a forward passenger receiving compartment and a rear load receiving compartment with the two compartments effectively isolated relative to each other against the free flow of air therebetween.

Another object of this invention, in accordance with the immediately preceding object, is to provide structure in addition to the van interior dividing partition which will effectively lengthen the rear load receiving compartment of the van interior.

Still another object of this invention is to provide an interior dividing partition for a van of the type hereinabove described and mounted within the associated van in a position spaced slightly rearward of the side door opening of the van.

Another object of this invention is to provide structure whereby the forward interior portion of a van may be more readily airconditioned (ventilated, heated and/or cooled) by the forward heating, ventilating and air cooling structure conventionally provided on vans of this type.

A final object of this invention to be specifically enumerated herein is to provide a van body interior dividing partition and attendant structure in accordance with the preceding objects and which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary right side elevational view of the forward portion of a typical light truck van with the right front door and side door structures removed and the partition and forward extension of the rear load receiving rear portion of the van interior fragmentarily illustrated in both solid and phantom lines.

FIG. 2 is a rear elevational view of the van with the open rear doors thereof framentarily illustrated;

FIG. 3 is a fragmentary vertical sectional view taken substantially upon the plane indicated by the section line 3—3 of FIG. 2; and FIG. 4 is a fragmentary horizontal sectional view taken substantially upon the plane indicated by the section line 4—4 of FIG. 3.

DESCRIPTION OF THE PREFERRED EMBODIMENT

Referring now more specifically to the drawings, the numeral 10 generally designates a light truck form of van including a longitudinally continuous top structure 12, longitudinally continuous side structures 14 and 16 and a longitudinally continuous floor structure 17. The rear of the van includes a rear wall structure 18 defining a door opening 20 therein and a pair of horizontally swingable rear doors 22 and 24 may be swung between the open positions thereof illustrated in FIG. 2 and closed positions closing the opening 20. In addition, the van 10 includes right and left front door openings 26 and 28 and a side door opening 30 in the side structure 14. A door 32 removably closes the opening 28, a similar door (not shown) is provided for removably closing the door opening 26 and side door structure (not shown) is provided for closing the side door opening 30.

The interior of the van includes a forward driver's seat 34, a forward passenger seat 36 and an elongated transverse bench-type passenger seat 38 spaced rearward of the seats 34 and 36 and registered with the side door opening 30. The passenger seat 38 includes opposite side depending floor structure engaging supports or legs 40 for supporting the seat 38 in elevated position relative to the floor structure 17.

The foregoing comprises a description of a conventional form of light truck-type van and it is to be understood that the dashboard area 42 of the van interior disposed forward of the front seats 34 and 36 includes controls (not shown) whereby the interior of the van may be airconditioned by heating, ventilating or cooling. The top, side and floor structures 12, 14, 16 and 17 as well as the rear wall structure 18 and the closed front of the van define a van interior 44 which is divided through the utilization of a transverse partition structure 46, see FIGS. 1–4, in order to form a forward van interior portion 48 and a rear van interior portion 50. The partition structure 46 extends between the top structure 12 and the floor structure 17 and between the side structures 14 and 16 to effectively prevent free air circulation between the portions 48 and 50. In addition, the partition structure 46 includes a window structure 52 therein including a pair of sliding window sections 54 and 56, the window structure 52 comprising a substantial duplicate of the sliding window structures provided in the rear wall portions of some pick-up truck cabs.

The area 58 disposed beneath the seat 38 between the supports or legs 40 thereof defines a storage area and the lower marginal portion of the partition structure 46 includes an opening 60 formed therein spaced inwardly of the upstanding opposite side margins 62 and 64 of the partition structure 46 and registered with the storage area 58.

An upwardly opening load receiving tray or housing structure 66 is provided and includes opposite sidewalls 68 and 70 and a bottom wall 72 extending between and interconnecting the lower marginal edges of the sidewalls 68 and 70. In addition, the forward end of the tray 66 includes an upstanding front wall 74 extending between the sidewalls 68 and 70 and a top wall 76 also extending between the sidewalls 68 and 70 extends rearward from the upper marginal edge of the front wall 74 and terminates rearwardly in an upwardly directed abutment flange 78 also extending between the sidewalls 68 and 70.

As may be seen from FIGS. 2 and 3 of the drawings, the forward portions of the sidewalls 68 and 70 and the forward portion of the bottom wall 72 as well as the front wall 74 and top wall 76 define a rearwardly opening receptacle 80 which opens rearwardly into that portion of the tray 66 disposed rearward of the abutment flange 78, the upper marginal edge of abutment flange 78 being substantially coplanar with the upper marginal edges of the sidewalls 68 and 70. The tray 66 is forwardly displaceable through (and rearwardly removable through) the door opening 20 and slidable along the floor structure 17 to a position with the receptacle 80 snugly received through the opening 60 and occupying a major portion of the storage area 58 beneath the seat 38 between the supports or legs 40. Accordingly, when tray 66 is in the position thereof illustrated in FIGS. 2 and 3 of the drawings, the receptacle defining forward portion of the tray 66 substantially fully closes the opening 60. In addition, the lower portion of the partition structure 46 could include the equivalent of the top wall 76, the front wall 74 and the forward end portions of the sidewalls 68 and 70 to define a recess in which to receive the forward receptacle portion 80 of the tray 66, which additional portions of the partition structure 46 would maintain the interior portions 48 and 50 isolated relative to each other against the free flow of air therebetween, even when the tray 66 is removed.

The upper marginal portions of the sidewalls 68 and 70 and the abutment flange 78 include lifting eyes 84 whereby suitable lifting means may be attached to the tray 66 in the event the tray as well as a reasonably heavy load supported therefrom is to be removed through the rear door opening 20.

The tray 66 appreciably forwardly extends the lower portion of the cargo load receiving area of the van interior 44 comprising the rear van interior portion 50 in order that longer loads may be carried within the rear van interior portion 50. The receptacle 80 may extend forwardly to a position immediately rearward of the front lower trim panel 88 of the passenger seat 38, see FIG. 1. In addition, if it is ever desired to utilize the rear van interior portion for also containing passengers of the van 10, the sliding window panels 54 and 56 may be opened and the tray 66 may be removed, whereby free air circulation between the interior portions 48 and 50 may be established with such air circulation being carried out by convection through proper position of the conventional adjustable louvers (not shown) of the van ventilating, heating, and air cooling system (not shown).

Any suitable means may be utilized to maintain the partition structure 46 in position immediately rearward of the passenger seat 38 and to establish a reasonably good air-tight seal between the marginal portions of the partition structure 46 and the opposing top, side and floor structures of the van 10. In addition, any suitable means (not shown) may be utilized to securely anchor the tray 66 in position relative to the floor structure 17 in order to prevent shifting of the tray structure 66 during rapid acceleration or deceleration of the van 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an enclosed passenger van of the light truck-type incorporation interconnected longitudinally continuous top, opposite side and floor structures, enclosing a single van interior including a forward operator's seat in a forward portion of the interior, passenger seat means in said forward portion spaced rearward of said operator's seat and an elongated longitudinally extending load receiving rear portion of said interior extending rearwardly from said passenger seat means, transveres partition means mounted in said interior and extending between said top, opposite side and floor structures closely rearward of said passenger seat means and effectively isolating said front and rear interior portions from each other aganist the free flow of air therebetween, whereby to provide a passenger van including an isolated rear load receiving area and a forward passenger receiving interior area which may be more readily and effectively air conditioned (ventilated, heated or cooled) by conventional vehicle front end mounted air conditioning structure opening directly into said forward van interior portion, said passenger seat means including an elongated transverse bench seat including depending opposite end support structures supporting said bench seat from said floor structure and defining a storage area therebetween beneath said bench seat and above said floor structure, said transverse partition means including a floor level opening formed therein registered and communicating with said storage area, and a rearwardly opening housing structure removably supported on said floor, closely received through and closing said opening and disposed in said storage area, whereby said storage area, inwardly of said housing structure, forms a forward continuation of said rear load receiving area extending through said opening and forwardly into said passenger receiving area, whereby the passenger receiving area may be air conditioned independent of the rear load receiving area.

2. The van of claim 1 wherein one of said opposite side structures includes a side door opening formed therein with which said passenger seat means is registered transversely of said van, said partition means extending transversely of said interior a spaced distance rearward of said side door opening.

3. The van of claim 1 wherein said housing structure includes interconnected opposite sidewalls, a bottom wall, front wall and at least a partial forward top wall closing at least the forward portion of said housing structure projecting forward through said floor level opening.

4. The van of claim 3 wherein said bottom and side walls extend considerably rearwardly of said partition means to define a rearward tray-type extension of said housing structure extending longitudinally of a major portion of said rear load receiving interior area.

5. The van of claim 4 wherein said van is closed at the rear end thereof by a rear wall structure, said rear wall structure having a rear door opening formed therein, rear door means mounted in said rear wall structure and shiftable relative thereto between closed and open positions closing and opening, respectively, said rear door opening, said housing structure and tray-type rearward extension thereof being removable, as a unit, rearwardly through said rear door opening when said rear door means is in the open position.

6. The van of claim 5 including selectively openable and closable window means mounted in said partition for selectively establishing and terminating airflow communication between said forward and rear interior portions.

7. In combination with an enclosed van of the type incorprating interconnected longitudinally continuous top, opposite side and floor structures enclosing a single van interior including a forward operator's seat, opposite side front door openings, a side door opening in one of said side structures spaced rearward of the associated side front door opening, a transverse bench-type passenger seat disposed in said interior, spaced rearward of the operator's seat and registered transversely of said van with said side door opening, an elongated longitudinally extending load receiving rear portion of said interior extending rearwardly from said passenger seat, transverse parrtition means mounted in said interior extending between said top, opposite side and floor structures closely rearward of said passenger seat and effectively isolating said front and rear interior portions from each other aganist the free flow of air therebetween, said passenger seat defining a rearwardly opening storage area therebeneath, a lower marginal portion of said partition means including an opening formed therein registered with said storage area, and rearwardly opening housing structure removably supported on said floor, closely received through and closing said partition means opening and disposed in said storage area, whereby said storage area, inwardly of said housing structure, forms a forward continuation of the rear load receiving area of the interior portion of said van.

8. The van of claim 7 wherein said passenger seat means comprises an elongated bench seat extending substantially fully between said opposite side structures.

* * * * *